(12) United States Patent
Maegawa et al.

(10) Patent No.: US 12,007,137 B2
(45) Date of Patent: Jun. 11, 2024

(54) INFRARED IMAGING ELEMENT COMPRISING TEMPERATURE DETECTION PIXELS, DRIVE LINES, SIGNAL LINES, VERTICAL SCANNING CIRCUIT, SIGNAL LINE SELECTION CIRCUIT, AND ONE OR MORE READ CIRCUITS, AND AIR CONDITIONER EQUIPPED WITH THE SAME

(71) Applicant: Mitsubishi Electric Corporation, Tokyo (JP)

(72) Inventors: Tomohiro Maegawa, Tokyo (JP); Daisuke Fujisawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 907 days.

(21) Appl. No.: 16/981,674

(22) PCT Filed: Jan. 28, 2019

(86) PCT No.: PCT/JP2019/002646
§ 371 (c)(1),
(2) Date: Sep. 16, 2020

(87) PCT Pub. No.: WO2019/234966
PCT Pub. Date: Dec. 12, 2019

(65) Prior Publication Data
US 2021/0190366 A1    Jun. 24, 2021

(30) Foreign Application Priority Data
Jun. 6, 2018    (JP) .................................. 2018-108943

(51) Int. Cl.
*F24F 11/88*    (2018.01)
*F24F 11/30*    (2018.01)
(Continued)

(52) U.S. Cl.
CPC .............. *F24F 11/88* (2018.01); *F24F 11/30* (2018.01); *G01J 5/0025* (2013.01); *G01J 5/10* (2013.01);
(Continued)

(58) Field of Classification Search
CPC ........ F24F 2120/12; G01J 5/0025; G01J 5/10; G01J 2005/0077; H04N 5/33; H04N 25/27
See application file for complete search history.

(56) References Cited

U.S. PATENT DOCUMENTS 5,757,008 A    5/1998    Akagawa et al.
5,952,659 A    9/1999    Yoneyama et al.
(Continued)

FOREIGN PATENT DOCUMENTS

CN    101860688 A    10/2010
EP    2 239 937 A2    10/2010
(Continued)

OTHER PUBLICATIONS

International Search Report issued in PCT/JP2019/002646; dated May 7, 2019.
(Continued)

*Primary Examiner* — Jerry-Daryl Fletcher
*Assistant Examiner* — Daniel C Comings
(74) *Attorney, Agent, or Firm* — Studebaker & Brackett PC

(57) ABSTRACT

A thermal infrared imaging element includes: a pixel array unit (100) that includes a plurality of temperature detection pixels (3) each of which includes a diode (1) and generates an electric signal in accordance with infrared rays received from an outside, the temperature detection pixels being arrayed in a two-dimensional fashion in a row and column directions; a plurality of drive lines (12) that are provided in
(Continued)

rows and that commonly connect one ends of the temperature detection pixels (3) in units of the rows; a plurality of signal lines (13) that are provided in columns and that commonly connect the other ends of the temperature detection pixels (3) in units of the columns; a vertical scanning circuit (4) that sequentially selects the drive lines; a signal line selection circuit (6) that sequentially selects the signal lines; and one or more read circuits (7) that amplify an electric signal from a temperature detection pixel connected to both one of the drive lines which is selected by the vertical scanning circuit and one of the signal lines which is selected by the signal line selection circuit. The number of the read circuits (7) is smaller than the number of the signal lines provided in the respective columns.

19 Claims, 8 Drawing Sheets

(51) Int. Cl.
  | | | |
  |---|---|---|
  | *G01J 5/00* | (2022.01) | |
  | *G01J 5/10* | (2006.01) | |
  | *H04N 5/33* | (2023.01) | |
  | *H04N 25/75* | (2023.01) | |
  | *F24F 120/12* | (2018.01) | |

(52) U.S. Cl.
CPC ............... *H04N 5/33* (2013.01); *H04N 25/75* (2023.01); *F24F 2120/12* (2018.01); *G01J 2005/0077* (2013.01)

(56) References Cited

U.S. PATENT DOCUMENTS

| | | |
|---|---|---|
| 2010/0201858 A1 | 8/2010 | Nakano et al. |
| 2010/0259662 A1 | 10/2010 | Oike et al. |
| 2011/0210251 A1* | 9/2011 | Onakado .............. H04N 25/671 250/332 |
| 2012/0038778 A1* | 2/2012 | Klager .................... H04N 5/33 348/E5.09 |
| 2012/0228506 A1 | 9/2012 | Honda et al. |
| 2013/0161488 A1 | 6/2013 | Doi |
| 2013/0229553 A1 | 9/2013 | Suzuki |
| 2020/0059610 A1* | 2/2020 | Maegawa ......... H01L 27/14649 |

FOREIGN PATENT DOCUMENTS

| | | | |
|---|---|---|---|
| EP | 3 447 461 A1 | 2/2019 | |
| JP | H05-187682 A | 7/1993 | |
| JP | 2921256 B2 * | 7/1999 | .............. F24F 11/02 |
| JP | 2004-233313 A | 8/2004 | |
| JP | 2010-183435 A | 8/2010 | |
| JP | 2012-026925 A | 2/2012 | |
| JP | 2012-060334 A | 3/2012 | |
| JP | 2013-183319 A | 9/2013 | |
| WO | 2017/183260 A1 | 10/2017 | |

OTHER PUBLICATIONS

An Office Action mailed by China National Intellectual Property Administration dated Mar. 5, 2023, which corresponds to Chinese Patent Application No. 201980036494.X and is related to U.S. Appl. No. 16/981,674; with English language translation.

An Office Action mailed by the European Patent Office dated May 4, 2023, which corresponds to European Patent Application No. 19 814 426.3-1208.

An Office Action mailed by China National Intellectual Property Administration dated Sep. 28, 2022, which corresponds to Chinese Patent Application No. 201980036494.X and is related to U.S. Appl. No. 16/981,674; with English language translation.

The extended European search report issued by the European Patent Office dated Jul. 22, 2021, which corresponds to European Patent Application 19814426.3-1208 and is related to U.S. Appl. No. 16/981,674.

* cited by examiner

Fig.3

| 4 | 8 | 12 | 16 |
|---|---|----|----|
| 3 | 7 | 11 | 15 |
| 2 | 6 | 10 | 14 |
| 1 | 5 | 9  | 13 |

Fig.4

| 4 |   | 8 |   |
|---|---|---|---|
| 3 |   | 7 |   |
| 2 |   | 6 |   |
| 1 |   | 5 |   |

Fig.5

|   |   |   | 4 |
|---|---|---|---|
|   |   | 3 |   |
|   | 2 |   |   |
| 1 |   |   |   |

| 4 | 12 | 8 | 16 |
|---|----|---|----|
| 3 | 11 | 7 | 15 |
| 2 | 10 | 6 | 14 |
| 1 | 9  | 5 | 13 |

|  | 4,12 | 8,16 |  |
|--|------|------|--|
|  | 3,11 | 7,15 |  |
|  | 2,10 | 6,14 |  |
|  | 1,9  | 5,13 |  |

INFRARED IMAGING ELEMENT COMPRISING TEMPERATURE DETECTION PIXELS, DRIVE LINES, SIGNAL LINES, VERTICAL SCANNING CIRCUIT, SIGNAL LINE SELECTION CIRCUIT, AND ONE OR MORE READ CIRCUITS, AND AIR CONDITIONER EQUIPPED WITH THE SAME

TECHNICAL FIELD

The present invention relates to a thermal infrared solid-state imaging element that detects a temperature change due to incident infrared rays with semiconductor sensors arrayed in a two-dimensional (2D) fashion and to an air conditioner including the same. More specifically, the present invention relates to a thermal infrared solid-state imaging device in which a signal processing circuit performs an integral process on electric signals from semiconductor sensors and then outputs resultant signals and to an air conditioner including the same.

BACKGROUND ART

A typical thermal infrared solid-state imaging element has pixels with a heat insulating structure which are arrayed in a 2D fashion. This thermal infrared solid-state imaging element captures an infrared image by utilizing temperature changes in the pixels due to incident infrared rays. In a known uncooled thermal infrared solid-state imaging element, a bolometer such as polysilicon, amorphous silicon, silicon carbide, or vanadium oxide or a semiconductor element such as a diode or a transistor is used for a temperature sensor that forms each pixel.

In a thermal infrared solid-state imaging element that uses diodes as temperature sensors, pixels are arrayed in 2D fashion. Further, the pixels in each row are connected together by a drive line, whereas the pixels in each column are connected together by a signal line. The individual drive lines are sequentially selected by a vertical scanning circuit and switches, and via a selected drive line, electric power is supplied from a power supply to the pixels. Outputs of the pixels are transmitted to an integrating circuit via the signal lines, after which the outputs are integrated and amplified by the integrating circuit. Then, the integrated, amplified outputs are sequentially output to an output terminal by a horizontal scanning circuit and switches.

For example, Patent Document 1 discloses a thermal infrared solid-state imaging element in which temperature detection units including diodes as temperature sensors each have a hollow heat insulation structure. In this thermal infrared solid-state imaging element, the temperature detection units are heated by infrared radiation rays emitted from a subject. The heat of each temperature detection unit is converted into an electric signal by a diode operating at a constant current, and this electric signal is output to an output terminal through an integrating circuit disposed for each pixel column.

In a field of image sensors represented by complementary metal oxide semiconductor (CMOS) sensors, a reading method that enables thinning out and intermittent output is employed in order to improve a frame rate, enhance a signal-to-noise (S/N) ratio due to weight reading and averaging, and reduce power consumption.

For example, Patent Document 2 discloses a solid-state imaging device that includes an imaging region, a vertical shift register circuit, and a pulse selector circuit. In the imaging region, a plurality of pixels are arranged in a 2D fashion. The vertical shift register circuit can select any pixel row from the plurality of pixels in the imaging region by varying the number and timing of clock signals given within one horizontal period. The pulse selector circuit supplies a drive pulse to any pixel row selected by the vertical shift register circuit. In this solid-state imaging device, a read circuit is disposed for each of the pixel columns. This configuration can select any selected pixel row to be read.

PRIOR ART DOCUMENTS

Patent Documents

Patent Document 1: JP 2004-233313 A
Patent Document 2: JP 2010-183435 A

SUMMARY OF THE INVENTION

Problems to be Solved by the Invention

In the configurations of Patent Documents 1 and 2, identical numbers of read circuits and pixel columns are disposed, and a layout area occupied by the read circuits is restricted by intervals at which the pixels are arrayed, which causes an increased chip area and eventually an increased cost.

An object of the present invention is to provide an infrared imaging element that can shrink a circuit area to reduce a manufacturing cost and an air conditioner including the infrared imaging element.

Means for Solving the Problems

An infrared imaging element according to the present invention includes: a pixel array unit that includes a plurality of temperature detection pixels each of which includes a diode and generates an electric signal in accordance with infrared rays received from an outside, the temperature detection pixels being arrayed in a two-dimensional fashion in a row and column directions; a plurality of drive lines that are provided in rows and that commonly connect one ends of the temperature detection pixels in units of the rows; a plurality of signal lines that are provided in columns and that commonly connect the other ends of the temperature detection pixels in units of the columns; a vertical scanning circuit that sequentially selects the drive lines; a signal line selection circuit that sequentially selects the signal lines; and one or more read circuits that amplify an electric signal from a temperature detection pixel connected to both one of the drive lines which is selected by the vertical scanning circuit and one of the signal lines which is selected by the signal line selection circuit. The number of the read circuits (7) is smaller than the number of the signal lines provided in the respective columns.

Effects of the Invention

According to the present invention, the number of read circuits is set to be smaller than the number of columns of temperature detection pixels. Consequently, it is possible to shrink a chip area, thereby reducing a cost.

BRIEF DESCRIPTION OF THE DRAWINGS

FIG. 3 is a diagram illustrating a first example of a sequence in which pixels are read.

FIG. 4 is a diagram illustrating a second example of the sequence in which pixels are read.

FIG. 5 is a diagram illustrating a third example of the sequence in which pixels are read.

EMBODIMENTS OF THE INVENTION

First Embodiment

Figure 1:
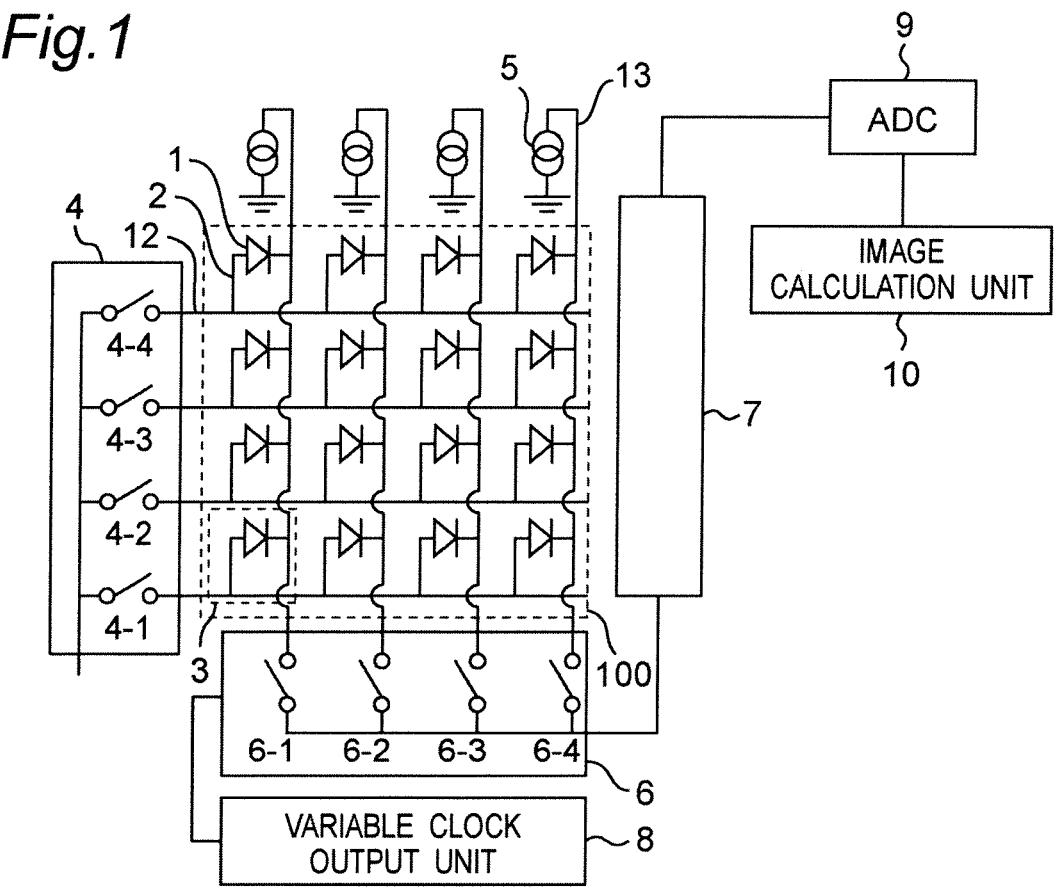
FIG. 1 is a configuration diagram of an infrared imaging element according to a first embodiment of the present invention.

FIG. 1 is a configuration diagram of an infrared imaging element according to a first embodiment. The infrared imaging element includes a pixel array unit 100, a vertical scanning circuit 4, a signal line selection circuit 6, a variable clock output unit 8, a read circuit 7, an analog/digital converter (ADC) 9, and an image calculation unit 10.

The pixel array unit 100 includes a plurality of temperature detection pixels 3 arrayed in a 2D fashion in row and column directions. Each of the temperature detection pixels 3 includes a diode 1 that converts intensity of received infrared rays into an electric signal. The plurality of temperature detection pixels 3 are commonly connected by pixel row drive lines 12 (an example of drive lines) in a horizontal direction, whereas the plurality of temperature detection pixels 3 are commonly connected by pixel column signal lines 13 (an example of signal lines) in a vertical direction.

More specifically, the pixel row drive lines 12 electrically connect anode sides of the temperature detection diodes 1 to the vertical scanning circuit 4 via corresponding support leg wirings 2. One of the pixel row drive lines 12 is connected to all the temperature detection pixels 3 on a corresponding one of the rows disposed in the pixel array unit 100. The pixel column signal lines 13 electrically connect cathode sides of the temperature detection diodes 1, the signal line selection circuit 6, and constant current sources 5 (an example of a current source) via the support leg wirings 2. One of the pixel column signal lines 13 is connected to all the temperature detection pixels 3 on a corresponding one of the columns disposed in the pixel array unit 100.

The vertical scanning circuit 4 selects only a pixel row drive line 12 on a row to be read from among the plurality of pixel row drive lines 12. The vertical scanning circuit 4 connects the selected pixel row drive line 12 to a power supply voltage terminal (not illustrated) from which a power supply voltage is supplied. As a result, via the selected pixel row drive line 12, the power supply voltage is supplied to the temperature detection pixel 3 connected to the pixel row drive line 12. For that purpose, the vertical scanning circuit 4 includes drive line selection switches 4-1 to 4-4 that selectively connect the power supply voltage terminal to the pixel row drive lines 12.

The signal line selection circuit 6 selects only a pixel column signal line 13 on a column to be read from among the plurality of pixel column signal lines 13 and connects the selected pixel column signal line 13 to the read circuit 7 in a subsequent stage. In short, an output of the signal line selection circuit 6 is supplied to the read circuit 7. The number of stages disposed in the read circuit 7 is set to be smaller than the number of pixel columns. In this case, disposition intervals at which the read circuit 7 do not necessarily have to be equal to intervals at which the pixel arrays are disposed. In the example of FIG. 1, the read circuit 7 is provided with one stage only. The signal line selection circuit 6 selects only any one of the pixel column signal lines 13 and connects the selected pixel column signal line 13 to the read circuit 7 in the subsequent stage. For that purpose, the signal line selection circuit 6 includes signal line selection switches 6-1 to 6-4 that selectively connect the pixel column signal lines 13 to the read circuit 7.

The variable clock output unit 8 is a circuit that outputs a control signal for use in controlling an operation of the signal line selection circuit 6. More specifically, the variable clock output unit B generates the control signal for use in switching the signal line selection switches 6-1 to 6-4 in the signal line selection circuit 6 at predetermined timing and outputs the control signal to the signal line selection circuit 6.

The read circuit 7 performs an amplification process on signals (i.e., signal components related to entry of infrared rays) read from the temperature detection pixels 3, thereby generating infrared entry signals.

The analog/digital converter 9 converts the infrared entry signals received from the read circuit 7 into digital signals. The image calculation unit 10 performs a predetermined image process (image synthesis, image determination, etc.) on the signals from the read circuit 7 which have been converted into the digital signals. For example, the image calculation unit 10 is a circuit that generates output signals by adjusting the array of the pixels in the output signals, based on the signals from the read circuit 7 that have been converted into the digital signals.

Figure 2:
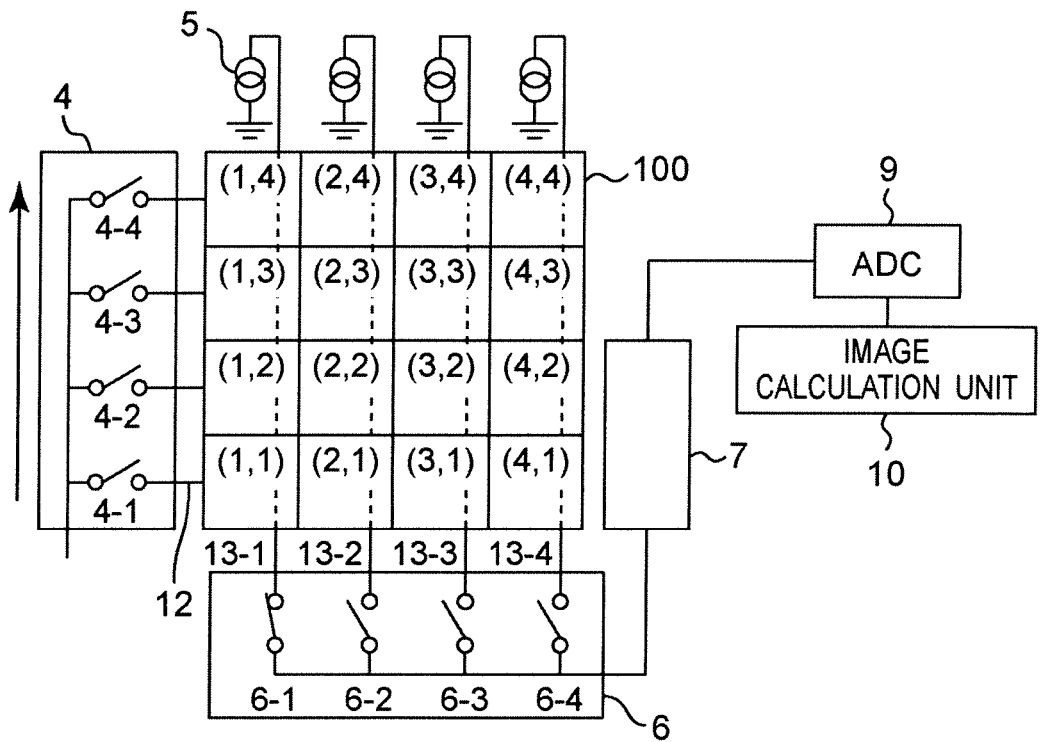
FIG. 2 is a diagram to which pixel array numbers, vertical scanning circuit numbers, and signal line selection circuit numbers are given, according to the first embodiment.

Hereinafter, an operation of reading pixel data in the infrared imaging element will be described. FIG. 2 is a diagram schematically illustrating a pixel configuration of the pixel array unit 100, which is used to explain the read operation. In the present embodiment, as an example, the pixel array unit 100 has a configuration in which the temperature detection pixels 3 are arranged with four rows and four columns; however, the numbers of rows and columns in the pixel array unit 100 are not limited to this. In the following description, a temperature detection pixel 3 at coordinates (x, y) will be referred to as a pixel (x, y).

When the vertical scanning circuit 4 turns on the drive line selection switch 4-1, a power supply voltage is applied to the pixel row drive line 12 connected to pixels (1,1), (2,1), (3,1), and (4,1). In this case, currents flow through all the pixels (1,1), (2,1), (3,1), and (4,1) selected by the drive line selection switch 4-1 in the vertical scanning circuit 4 because all the columns are connected to the respective constant current sources 5. As a result, the signal components related to the infrared rays that have entered all of the pixels (1,1) to (4,1) are output to the respective pixel column signal lines 13.

The signal line selection circuit 6 selects one of the signal line selection switches (the signal line selection switch 6-1 in FIG. 2). A terminal of the selected switch is connected to the read circuit 7. As a result, the read circuit 7 receives the signal components related to the incident infrared rays from the pixel column signal line 13 connected to the selected signal line selection switch. Then, the read circuit 7 performs the amplification process on the received signal components and outputs these signal components.

All of the temperature detection pixels 3 arranged in the row selected by the vertical scanning circuit 4 are in a conductive state. In this case, if the vertical scanning circuit 4 sequentially selects the drive line selection switches 4-1 to 4-6, conduction periods of all the temperature detection pixels 3 arranged in the pixel array unit 100 become constant, regardless of a selection sequence of the signal line selection circuit 6. Therefore, temperature detection errors due to the irregularity of the above conduction periods and non-conduction periods do not occur.

Signal components output from the read circuit 7 are converted into digital signals by the analog/digital converter (ADC) 9 in a subsequent stage. Then, the image calculation unit 10 performs image synthesis or image determination, based on the digitally converted signals from the read circuit 7. For example, the image calculation unit 10 generates an output image by obtaining an average of signals from the read circuit 7 for each pixel or by rearranging the signals from the read circuit 7 in any given array.

According to the above configuration of the infrared imaging element, the number of stages in the read circuit 7 is set to be smaller than that of the pixel columns. Thus, this configuration can shrink the chip area, thereby reducing the chip cost. Furthermore, the deposition intervals of the read circuit 7 are not restricted by intervals between the temperature detection pixels 3, which increases the degree of freedom in the circuit configuration and easily improves the element performance.

FIG. 3 is a diagram illustrating an example of a sequence in which pixels are read in the infrared imaging element in the present embodiment. First, the signal line selection circuit 6 selects the signal line selection switch 6-1, and in this state, the vertical scanning circuit 4 sequentially switches a drive line selection switch to be turned on from the switch 4-1 to the switch 4-4. After turning on the drive line selection switch 4-4, the vertical scanning circuit 4 returns the sequence to the drive line selection switch 4-1 again. At the same time, the signal line selection circuit 6 switches to a next signal line selection switch. In other words, the signal line selection circuit 6 selects the signal line selection switch 6-2. After that, likewise, the vertical scanning circuit 4 sequentially switches from the drive line selection switch 4-1 to the drive line selection switch 4-4. By repeating the switching of the signal line selection switches 6-1 to 6-4 and the drive line selection switch 4-1 in this manner, the read circuit 7 can sequentially read data for one screen (frame).

As long as the vertical scanning circuit 4 sequentially select the drive line selection switches 4-1 to 4-4, the conduction periods of all the temperature detection pixels 3 arranged in the pixel array unit 100 are constant even if the signal line selection circuit 6 selects the signal line selection switches 6-1 to 6-4 in any sequence. If the conduction period and the non-conduction period are irregular, self-heating states of the pixels differ every time the reading operation is performed. Compared to small amounts of heat generated by the temperature detection units due to the entry of infrared rays, the difference in the self-heating state may be nonnegligible, in which case temperature detection errors might occur. In contrast, when the conduction periods of the temperature detection pixels are made constant as described above, the temperature detection errors, which would occur due to the difference in the self-heating state caused by the irregularity of the conduction period and the non-conduction period, do not occur.

Utilizing the above advantage also enables intermittent output in the column direction as illustrated in FIG. 4. It is thereby possible to perform reading at a high frame rate. This reading method enables a method of reading (i.e., a method of driving) pixels to be changed, for example, in accordance with a speed of a moving object to be observed. For example, if an object to be observed is moving at a low speed, a method of reading pixels can be set to full-screen reading as illustrated in FIG. 3. If an object moving at a high speed is observed, the method of reading pixels is switched to intermittent reading as illustrated in FIG. 4 so as to follow the high-speed moving object. Those controls can be achieved by changing a clock pattern supplied from the variable clock output unit 8 to the signal line selection circuit 6. In this way, the variable clock output unit 8 can change the control signal to be supplied to the signal line selection circuit 6, thereby switching to various operation modes.

As illustrated in FIG. 5, the reading in an oblique direction is also possible. If pixels being read are regarded as a boundary line, this reading method enables a moving object intersecting this boundary line to be determined at a high frame rate.

Figure 6:
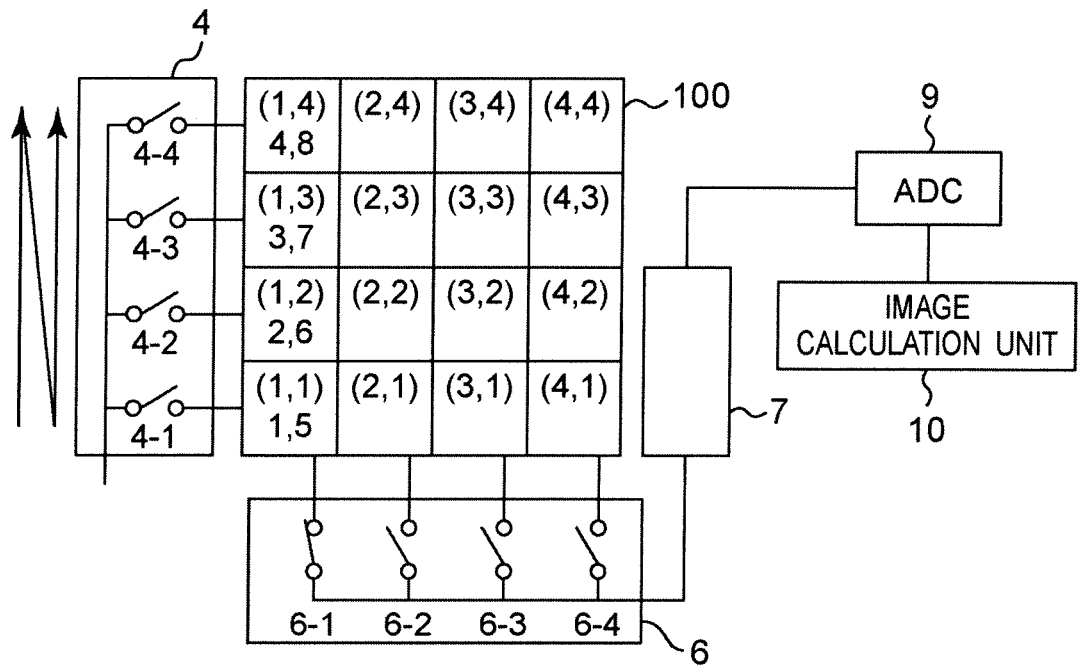
FIG. 6 is a diagram illustrating a fourth example of the sequence in which pixels are read.

As illustrated in FIG. 6, the read circuit 7 may continuously read the pixels in the same column multiple times. More specifically, the read circuit 7 scans the pixels connected to one pixel column in the pixel array unit 100 multiple times (M times: M is an integer of 2 or more) in the column direction, thereby reading data from these pixels. In short, over a period of repeating, M times, scans of a certain pixel column from a first row (e.g., a lowermost row) to a last row (e.g., an uppermost row), the signal line selection circuit (6) continues to select the same pixel column and read image data. After the read circuit 7 completely repeats the scans of one pixel column M times, a pixel column to be read is shifted to a next pixel column and the same reading operation is performed. In this case, the image calculation unit 10 averages an M number of output signals obtained from the same pixel, thereby determining an output signal of this pixel.

The above reading method enables an image to be obtained with reduced temporal errors that may occur at the time of performing integration of a plurality of frames of one screen output, for example, as illustrated in FIG. 3.

If screens are sequentially output as illustrated in FIG. 3, the pixel (1,1) is output first for an n-th frame, and then is output for a following (n+1)-th frame with a time delay corresponding to the number of pixel rows by the number of pixel columns. When an object moves at a fast speed, this time delay may cause image blurring. In contrast, in the reading method as illustrated in FIG. 6, the pixel (1,1) is output for the n-th frame and then output for the (n+1)-th frame at a timing delayed according to the number of pixel rows. This delay time is shorter than that in the reading method illustrated in FIG. 3, and the risk of image blurring can be reduced. In this case, a time in which the vertical scanning circuit 4 scans the first row to the last row in each pixel row drive line 12 can be set to be shorter than a frame rate for one screen. Therefore, it is possible to average output signals among pieces of information with short time lags, thereby achieving both high-speed moving object imaging and high-accuracy imaging.

The reading methods illustrated in FIGS. 3 to 6 are examples. As long as the vertical scanning circuit 4 is sequentially selected, the conduction periods of all the temperature detection pixels 3 arranged in the pixel array unit 100 are constant, regardless of a selection sequence of the signal line selection circuit 6. Therefore, the effect of preventing temperature detection errors that would occur due to irregularity of the conduction periods and the non-conduction periods described above is maintained. In short, a selection method performed by the signal line selection circuit 6 may be changed as appropriate, depending on a usage application and is not limited to any of the reading methods illustrated in FIGS. 3 to 6.

If the temperature detection pixel 3 does not have an infrared absorption structure 14, an area of a temperature detection unit 15 corresponds to an infrared ray receiving area, in which case the sensitivity is lowered and the infrared ray receiving sensitivity is lowered. Even in that case, however, no problem arises as long as the S/N performance satisfies a performance required by the usage application. In that sense, the infrared absorption structure 14 is not an essential configuration.

Second Embodiment

Figure 7:
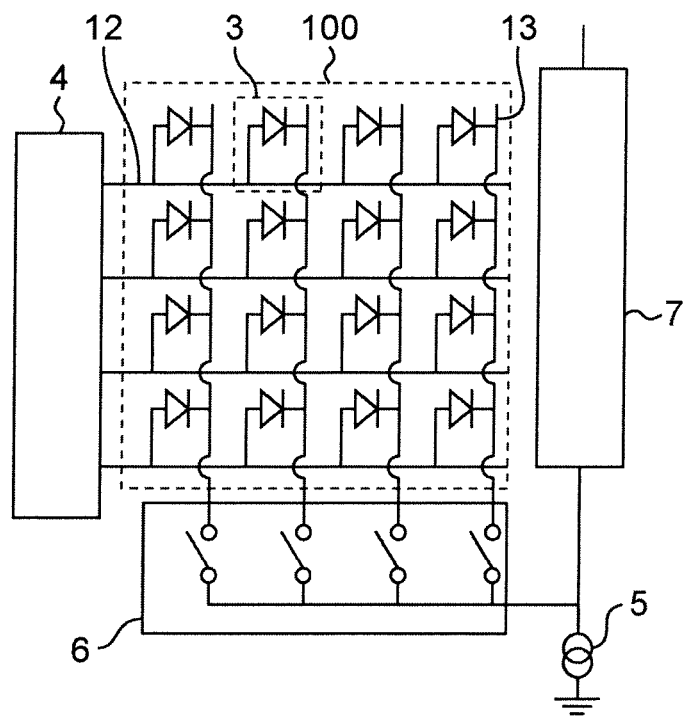
FIG. 7 is a configuration diagram of an infrared imaging element according to a second embodiment of the present invention.

FIG. 7 is a circuit diagram of an infrared solid-state imaging element according to a second embodiment. One difference from the first embodiment is a position of a constant current source 5. In the first embodiment, the constant current sources 5 are connected to the pixel column signal lines 13. In the second embodiment, however, the constant current source 5 is connected to a node at which an output of a signal line selection circuit 6 is connected to a read circuit 7.

According to the above configuration, of temperature detection pixels 3 connected to pixel row drive lines 12 selected by a vertical scanning circuit 4, only pixels 3 connected to pixel column signal lines 13 selected by the signal line selection circuit 6 operate at a constant current. The remaining pixels are in a non-conduction state.

In the above case, sequences (selection cycles) in which both the vertical scanning circuit 4 and the signal line selection circuit 6 select the pixels are fixed to be constant, and a conduction period and non-conduction period for each pixel are adjusted to be constant. As illustrated in FIG. 3, for example, when all the pixels are sequentially selected and read in the row direction and the column direction, each temperature detection pixel 3 is conducted only in a read period of one pixel within an output period of one screen. This prevents temperature detection errors that would occur due to irregularity of the conduction period and the non-conduction period.

Figures 8, 9, 10:
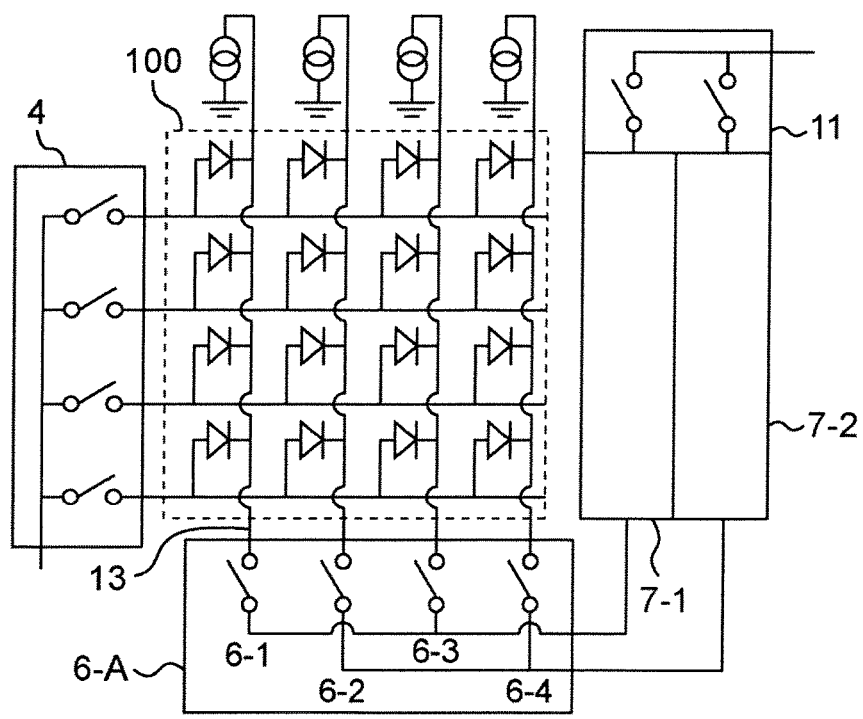
FIG. 8 is a diagram illustrating a first example of a sequence in which pixels are read, according to the second embodiment.
FIG. 9 is a diagram illustrating a second example of the sequence in which pixels are read, according to the second embodiment.
FIG. 10 is a configuration diagram of an infrared imaging element according to a third embodiment of the present invention.

If a selection sequence of the signal line selection circuit 6 is changed as illustrated in FIG. 8, all the temperature detection pixels 3 are conducted only in the read period of one pixel within the output period of one screen. This also prevents temperature detection errors that would occur due to the irregularity of the conduction period and the non-conduction period. Even if temperature detection pixel 3 to be read are selected in the pixel array unit 100 as illustrated in FIG. 9, the same effect can be produced.

It should be noted that the reading method is not limited to the above example, and it is only necessary that the selection sequences of the vertical scanning circuit 4 and the signal line selection circuit 6 are fixed to be constant and the conduction and non-conduction periods for each pixel are adjusted to be constant.

As in the first embodiment, the circuit configuration in the second embodiment can set the number of stages in the read circuit 7 to be smaller than the number of pixel columns, thereby shrinking the chip area and, as a result, reducing the chip cost. The circuit configuration can also shrink a mount area of the constant current source 5, thereby further shrinking the chip area. Furthermore, since only one constant current source 5 is connected to the plurality of pixel column signal lines 13, it is possible to suppress variations in performances of the constant current source 5 and, as a result, variations in characteristics.

The second embodiment provides substantially the same effects as the first embodiment, such as high-frame-rate reading/low-frame-reading, an S/N improvement obtained as a result of averaging multiple readings, a possibility of changing the reading method such as thinning out or intermittent output in order to decrease power consumption.

Third Embodiment

FIG. 10 is a circuit diagram of an infrared imaging element according to a third embodiment. One difference from the first embodiment is that read circuits 7-1 and 7-2 are disposed in two stages (a plurality of stages) and moreover a horizontal scanning circuit 11 is disposed at a subsequent stage of the read circuits 7-1 and 7-2. The horizontal scanning circuit 11 outputs, in a serial manner, signals output from the read circuits 7-1 and 7-2. Another difference is that a signal line selection circuit 6 connects any one of odd-numbered columns of pixel column signal lines 13 to the read circuit 7-1 and further connects any one of even-numbered columns of pixel column signal lines 13 to the read circuit 7-2.

Figure 11:
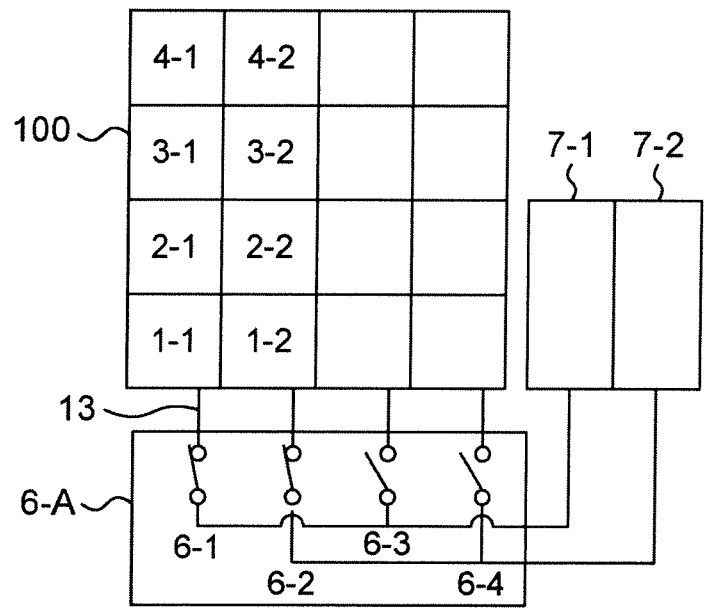
FIG. 11 is a diagram illustrating an example of a sequence in which pixels are read, in a configuration illustrated in FIG. 13.

FIG. 11 is a diagram illustrating a sequence of reading pixels in a configuration of the infrared imaging element illustrated in FIG. 10. The signal line selection circuit 6-A connects a pixel column signal line 13 of an odd column (i.e., a first column or a third column) to the first read circuit 7-1. Likewise, the signal line selection circuit 6-A connects a pixel column signal line 13 of an even column (i.e., a second column or a fourth column) to the second read circuit 7-2. In short, the pixel column signal lines 13 are divided into odd-column and even-column groups. Then, the signal line selection circuit 6-A connects a pixel column signal line 13 in the odd-column group to the read circuit 7-1 and further connects a pixel column signal line 13 in the even-column group to the read circuit 7-2. This connection enables the pixels in first and second pixel columns to be read at the same time, thereby improving the frame rate. Furthermore, the connection can make the number of stages disposed in the read circuits 7-1 and 7-2 smaller than the number of pixel columns. Therefore, it is possible to shrink the chip area, thereby reducing the chip cost. Furthermore, even if the same element is used, it is possible to change a reading method, such as high-frame-rate or low-frame reading, an S/N improvement obtained as a result of averaging multiple readings, and thinning out or intermittent output in order to decrease power consumption.

Figure 12:
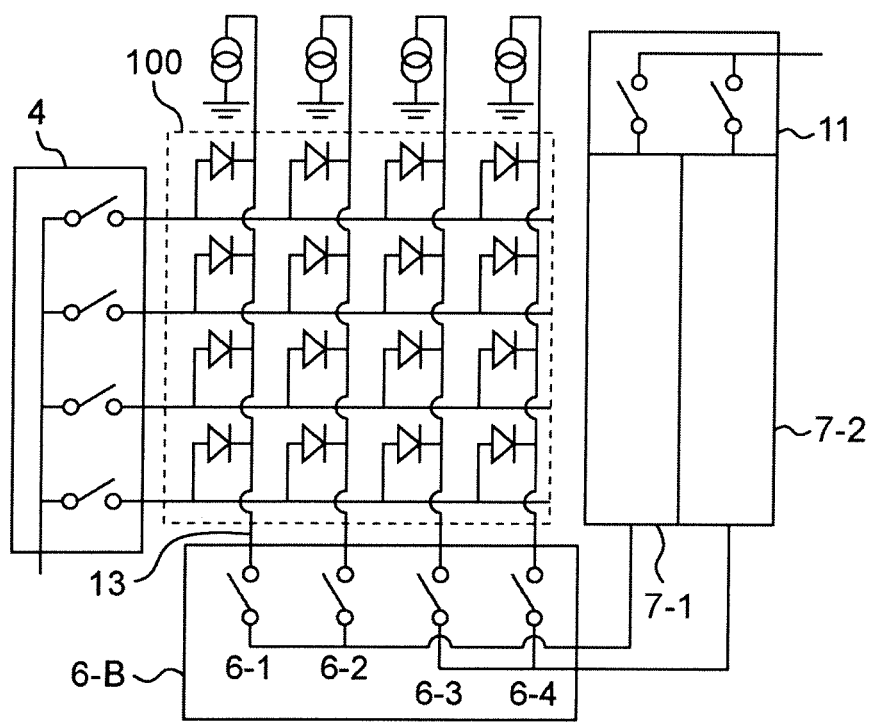
FIG. 12 is a diagram illustrating another configuration of a signal line selection circuit, according to the third embodiment.

FIG. 12 is a diagram illustrating another configuration of the circuit diagram of the infrared imaging element according to the third embodiment. In the configuration of FIG. 12, a signal line selection circuit 6-B selects one pixel column signal line 13 to be connected to the read circuit 7-1. The signal line selection circuit 6-B connects pixel column signal lines 13 of first and second columns to the read circuit 7-1 and further connects pixel column signal lines 13 of third and fourth columns to the read circuit 7-2. In shorts, the pixel column signal lines 13 are divided into first-half and second-half groups. Then, the signal line selection circuit 6-B connects the pixel column signal lines 13 in the first-half group to the read circuit 7-1 and further connects the pixel column signal lines 13 in the second-half group to the read circuit 7-2.

Figure 13:
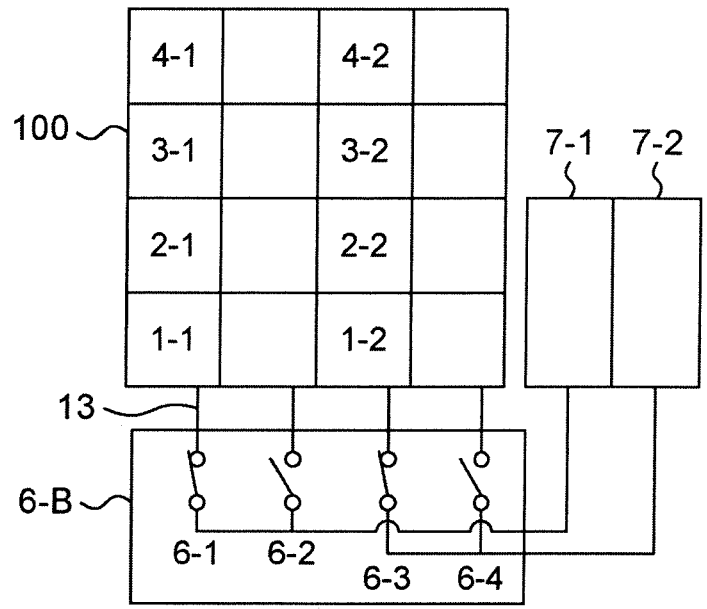
FIG. 13 is a diagram illustrating an example of a sequence in which pixels are read, in a configuration illustrated in FIG. 15.

FIG. 13 is an explanatory diagram of a sequence of reading the pixels in the configuration illustrated in FIG. 12. As described above, a selection method employed by a signal line selection circuit 6 can be deployed appropriately, for example, for each area. The number of groups into which the pixel column signal lines 13 are divided, namely, the number of stages in the read circuit 7 is not limited to two and may be any (N) number smaller than the number of pixel columns.

As described above, providing a plurality of read circuits 7 can improve the frame rate and employ various image acquisition methods. For example, by simultaneously selecting adjacent pixel columns, a movement of an object across a pixel array unit can be detected at a high frame rate. Alternatively, by simultaneously selecting separated pixel columns, high-frame-rate detection is possible with a wide angle of view ensured. Furthermore, by disposing the horizontal scanning circuit 11 in the subsequent stage of the read circuits 7-1 and 7-2, signal components can be output via a single output terminal.

Fourth Embodiment

Figure 14:
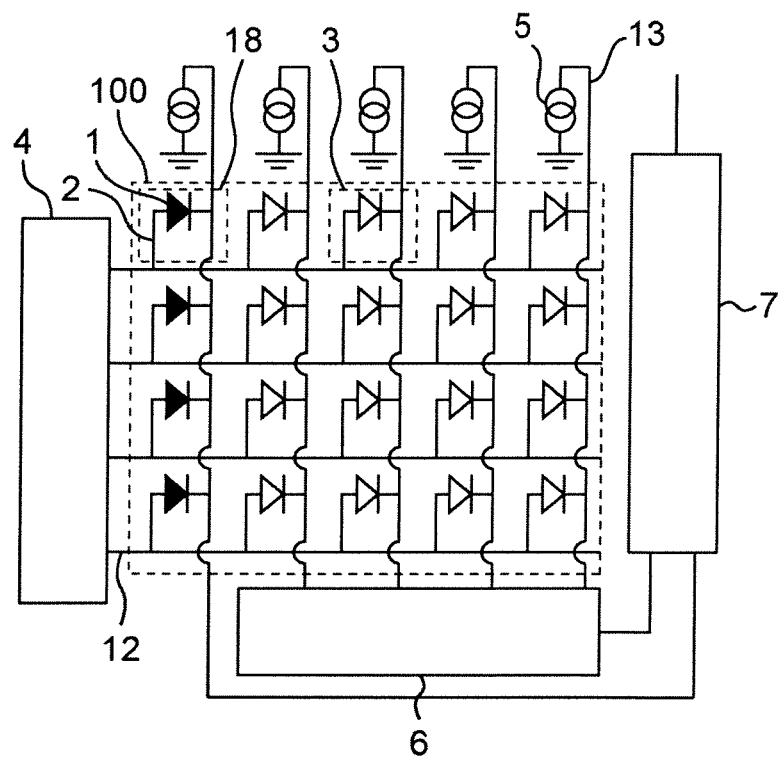
FIG. 14 is a configuration diagram of an infrared imaging element including reference pixels, according to a fourth embodiment of the present invention.

FIG. 14 is a circuit diagram of the infrared imaging element according to a fourth embodiment. One difference from the first embodiment is that a pixel array unit 100 is provided with reference pixels 18 that are insensitive to infrared rays coming from an outside. Signal components generated by the reference pixels 18 are supplied to a read circuit 7. The read circuit 7 amplifies and outputs a differential signal generated from signal components of the reference pixels 18 and temperature detection pixels 3. In the pixel array unit 100, the number of columns in which reference pixels 18 are provided may be one. Anode terminals of temperature detection diodes 1 in the reference pixels 18 are connected to the respective pixel row drive line 12, whereas cathode terminals of the temperature detection diodes 1 are connected to the respective pixel column signal lines 13.

Figure 15:
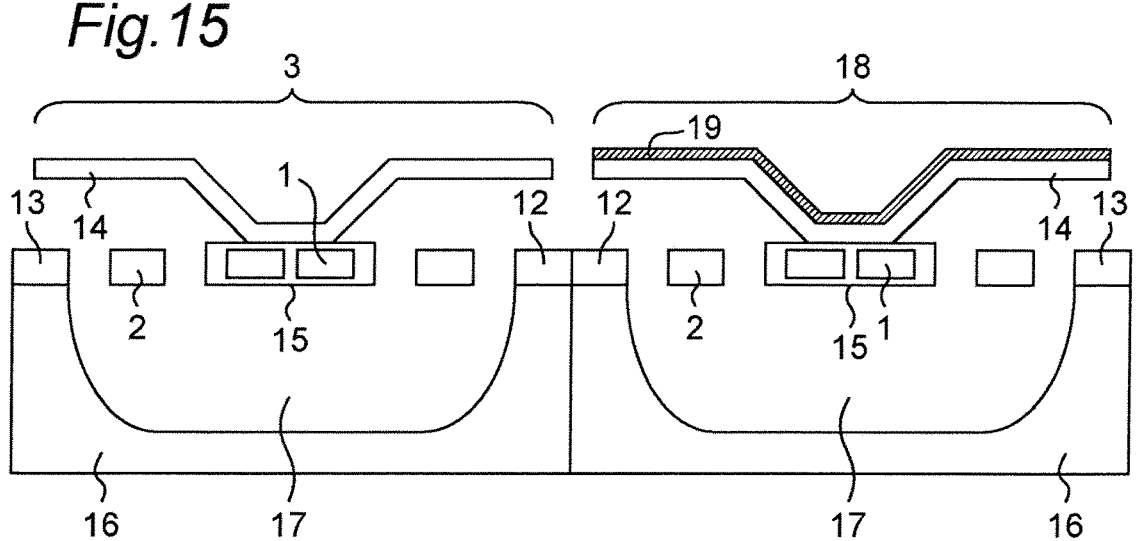
FIG. 15 is a diagram illustrating a first example of cross-sectional structures of a temperature detection pixel and a reference pixel.
Figure 16:
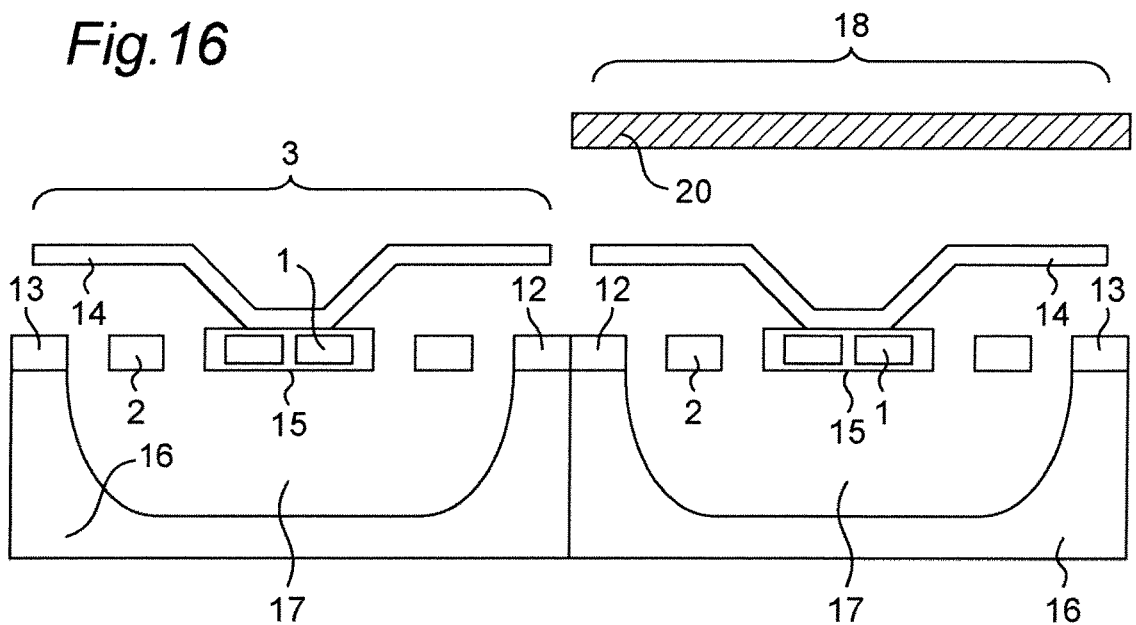
FIG. 16 is a diagram illustrating a second example of the cross-sectional structures of the temperature detection pixel and the reference pixel.
Figure 17:
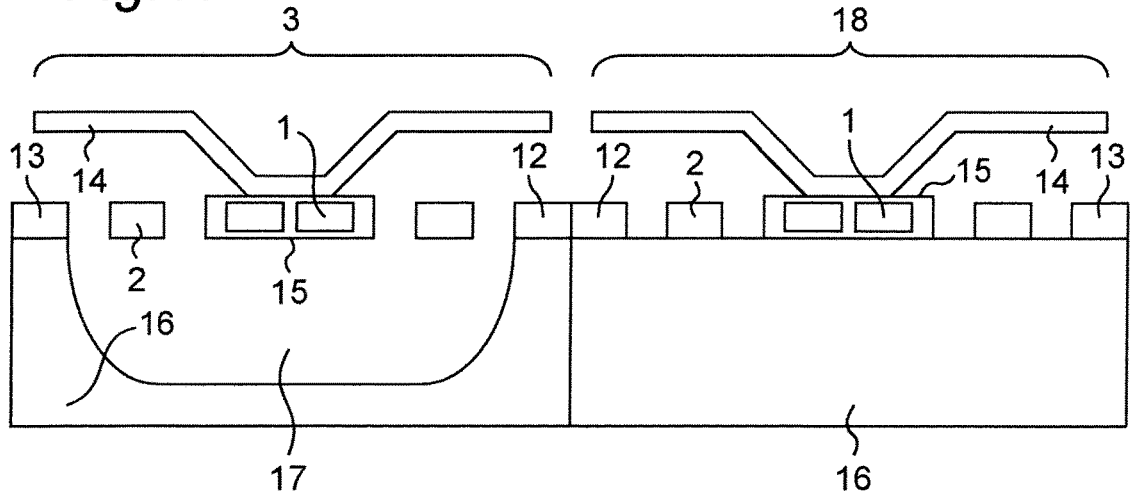
FIG. 17 is a diagram illustrating a third example of the cross-sectional structures of the temperature detection pixel and the reference pixel.

FIGS. 15 to 17 are diagrams each illustrating an example of cross-sectional structures of a temperature detection pixel 3 and a reference pixel 18, and the cross-sectional structures of the respective reference pixels 18 differ from one another.

The temperature detection pixel 3 includes: a temperature detection unit 15 that includes a temperature detection diode; an infrared absorption structure 14 connected to the temperature detection unit 15; and a support leg wiring 2 that supports the temperature detection unit 15. The support leg wiring 2 electrically connects the temperature detection unit 15 to a corresponding pixel row drive line 12 and pixel column signal line 13. The support leg wiring 2 keeps the temperature detection unit 15 in a hollow state so that the temperature detection unit 15 is not directly and thermally connected to a substrate 16. For this reason, the substrate 16 is provided with the hollow part 17. When entering the pixel from the above, infrared rays are absorbed in the infrared absorption structure 14, and then the infrared absorption structure 14 generates heat, changing temperature of the temperature detection unit 15. This temperature change varies a difference in voltage between the anode and cathode of the temperature detection diode 1 in the temperature detection unit 15 because the temperature detection diode 1 operates at a constant current because of an effect of the constant current source 5. As a result of this behavior, a voltage of the pixel column signal line 13 contains a voltage component proportional to the incident infrared rays. Similar to the temperature detection pixel 3, the reference pixel 18 includes: a temperature detection unit 15 that includes a temperature detection diode 1; and a support leg wiring 2.

In the example illustrated in FIG. 15, the reference pixel 18 further includes an infrared non-absorption structure 19 in addition to the configuration of the temperature detection pixel 3, and the infrared non-absorption structure 19 absorbs infrared rays on a light receiving surface side of an infrared absorption structure 14. The infrared non-absorption structure 19 is made of a material having a high reflectance in an infrared wavelength range.

In an example illustrated in FIG. 16, the reference pixel 18 has an infrared shielding film 20 in addition to the configuration of the temperature detection pixel 3, and the infrared shielding film 20 blocks infrared rays from entering the temperature detection unit 15. The infrared shielding film 20 is disposed on the light receiving surface side of the infrared absorption structure 14 in order to prevent infrared rays from entering the light receiving surface of the infrared absorption structure 14.

In an example illustrated in FIG. 17, the reference pixel 18 is constructed such that a hollow heat insulating structure is not provided in the configuration of the temperature detection pixel 3. In short, the reference pixel 18 is not provided with the hollow part 17 in the substrate 16.

Each of the configurations illustrated in FIGS. 15 to 17 suppresses the reference pixel 18 from being influenced by infrared rays coming from the outside.

The conduction period and non-conduction period for the reference pixel 18 illustrated in FIG. 15 or 16 coincide with the conduction period and non-conduction period for the temperature detection pixel 3, as long as a vertical scanning circuit 4 constantly scans a first stage to a last stage. In this case, a tendency of an output signal from the reference pixel 18 toward self-heating generated by the conduction and non-conduction is substantially the same as that of the temperature detection pixel 3. Therefore, when obtaining a differential signal of the reference pixel 18 and the temperature detection pixel 3, the read circuit 7 can remove signal components generated due to the self-heating and temperature of a substrate, thereby obtaining an output with its output change reduced in relation to a substrate temperature change. However, temperature of the self-heating depends on a relationship between heat capacities of the temperature detection unit 15 and the infrared absorption structure 14 and thermal conductance of the support leg wiring 2. Furthermore, each of the signal components from the reference pixel 18 and the temperature detection pixel 3 contains common-mode noise from the power supply terminal. Therefore, by determining a difference between the two signals, an influence of power supply noise can be reduced.

In the reference pixel 18, the infrared shielding film 20 is disposed so as not to make thermal contact with the temperature detection unit 15 in the reference pixel 18, as illustrated in FIG. 16. In this case, the structure of the reference pixel 18 can coincide with the structure of the temperature detection pixel 3. The configuration illustrated in FIG. 16 is more preferable than the configuration illustrated in FIG. 15 because the configuration of FIG. 16 is more effective in removing the signal component generated due to the self-heating and the substrate temperature. Likewise, the read circuit 7 can determine a difference between the signal components from the reference pixel 18 and the temperature detection pixel 3, thereby removing noise components contained in the power supply voltage that the vertical scanning circuit 4 applies to the pixel row drive line 12. Consequently, it is possible to improve the S/N.

Since the hollow part 17 is not provided in the reference pixel 18 having the configuration illustrated in FIG. 17, namely, no hollow heat insulating structure is formed, the reference pixel 18 generates signal components due to the substrate temperature without generating the self-heating. Therefore, when obtaining the differential signal of the reference pixel 18 and the temperature detection pixel 3, the read circuit 7 can remove signal components generated due to the substrate temperature, thereby obtaining an output with its output change reduced in response to the substrate temperature change. Furthermore, the read circuit 7 can also remove noise components contained in the voltage of a power supply terminal Vd by employing differential output. It is thereby possible to improve the S/N.

The reference pixel 18 is not limited to any of the structures of the reference pixels illustrated in FIGS. 15 to 17. The reference pixel 18 may employ any configuration as long as the reference pixel 18 is connected to a power supply terminal by the vertical scanning circuit 4, operates in a conduction and non-conduction period same as those of the temperature detection pixel 3, and is insensitive to infrared rays coming from the outside.

The reference pixels 18 are arranged outside the pixel array unit 100 in FIG. 14; however, an arrangement of the reference pixels 18 is not limited to this. For example, the reference pixels 18 may be arranged on a right and left sides of the pixel array unit 100 in the row direction. This configuration can improve precision of the differential signal. Alternatively, the reference pixels 18 may be arranged in a plurality of columns within the pixel array unit 100. This configuration can further improve precision of the differential signal.

Fifth Embodiment

Figure 18:
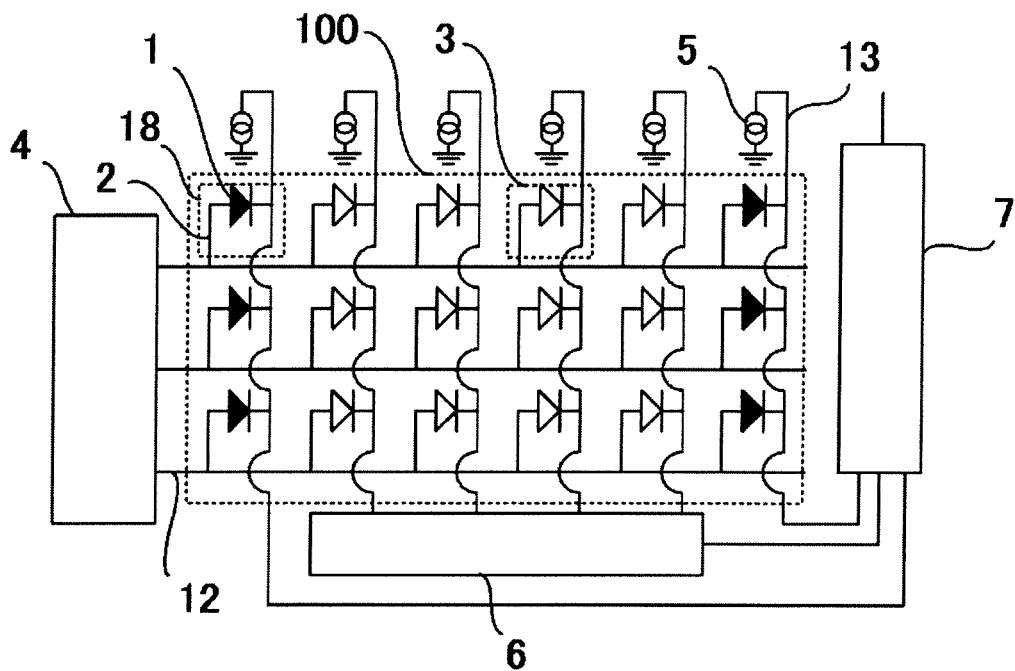
FIG. 18 is a configuration diagram of an infrared imaging element including reference pixels, according to a fifth embodiment of the present invention.

FIG. 18 is a circuit diagram of an infrared imaging element according to a fifth embodiment. One difference from the fourth embodiment is that reference pixels 18 that are insensitive to infrared rays coming from an outside are arranged at both ends of pixel row drive lines 12 of a pixel array unit 100. Signal components generated by the reference pixels 18 are supplied to a read circuit 7. The read circuit 7 amplifies and outputs a differential signal generated from signal components of the reference pixels 18 and temperature detection pixels 3.

In the fifth embodiment, the read circuit 7 outputs a differential signal of a temperature detection pixel 3 from which a signal is to be read and a relating reference pixel 18. In which case, the relating reference pixel 18 corresponds to one of the reference pixels 18 that are connected to both ends of the pixel row drive line 12 to which the temperature detection pixel 3 is connected and that is closer to the temperature detection pixel 3. This configuration can remove signal components generated due to self-heating and substrate temperature, thereby precisely obtaining an output with its output change reduced in response to a change in the substrate temperature. In the pixel array unit 100, the columns of the reference pixels 18 may be provided at least at respective ends of the pixel row drive lines 12.

Sixth Embodiment

Figure 19:
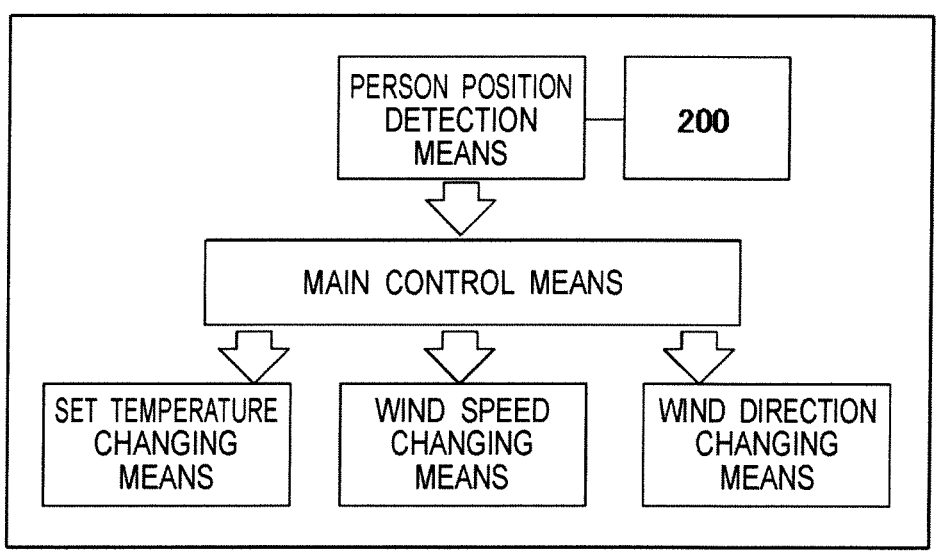
FIG. 19 is a diagram illustrating a configuration of an air conditioner according to a sixth embodiment of the present invention.

FIG. 19 is a schematic diagram illustrating a configuration of an air conditioner according to a sixth embodiment of the present invention, and an overall configuration is denoted by 300. In FIG. 19, an air conditioner 300 includes: position detection means for detecting a position of a human body present, based on a signal from an infrared imaging element 200; main control means for performing main control for the air conditioner 300; set temperature changing means for changing a set temperature; a wind direction changing means for changing a direction of air blown from the air conditioner 300 by using a wind direction control blade, for example; and a wind speed changing means for changing a speed of the air blown from the air conditioner 300.

In the air conditioner 300, the position detection means senses a position of a human body present from an output of the infrared imaging element 200 having a certain infrared detection area. When the position detection means senses that the human body has entered an area within a certain distance from the air conditioner 300, the main control means controls the set temperature changing means, the wind speed changing means, and the wind direction changing means, thereby setting a set temperature, a wind speed, and a wind direction. In this way, the air conditioner 300 is controlled automatically in accordance with a movement of a person and in accordance with a movement of a human body without involving any inconvenient setting operations. Consequently, it is possible to provide comfortable and convenient air conditioner control.

DESCRIPTION OF REFERENCE SYMBOLS

1 TEMPERATURE DETECTION DIODE
2 SUPPORT LEG WIRING
3 TEMPERATURE DETECTION PIXEL
4 VERTICAL SCANNING CIRCUIT
5 CONSTANT CURRENT SOURCE
6 SIGNAL LINE SELECTION CIRCUIT
7 READ CIRCUIT
8 VARIABLE CLOCK OUTPUT UNIT
9 ANALOG/DIGITAL CONVERTER
10 IMAGE CALCULATION UNIT
11 HORIZONTAL SCANNING CIRCUIT

12 PIXEL ROW DRIVE LINE
13 PIXEL COLUMN SIGNAL LINE
14 INFRARED ABSORPTION STRUCTURE
15 TEMPERATURE DETECTION UNIT
16 SUBSTRATE
17 HOLLOW PART
18 REFERENCE PIXEL
19 INFRARED NON-ABSORPTION STRUCTURE
20 INFRARED SHIELDING FILM
100 PIXEL ARRAY UNIT
200 INFRARED IMAGING ELEMENT
300 AIR CONDITIONER

The invention claimed is:

1. An infrared imaging element comprising:
a pixel array unit that includes a plurality of temperature detection pixels each of which includes a diode and generates an electric signal in accordance with infrared rays received from an outside, the temperature detection pixels being arrayed in a two-dimensional fashion in rows and columns;
a plurality of drive lines that are provided in rows, each of the drive lines commonly connecting first ends of the temperature detection pixels in one of the rows of the temperature detection pixels;
a plurality of signal lines that are provided in columns, each of the signal lines commonly connecting second ends of the temperature detection pixels in one of the columns of the temperature detection pixels;
a vertical scanning circuit that sequentially selects the drive lines;
a signal line selection circuit that sequentially selects the signal lines; and
one or more read circuits that amplify an electric signal from one of the temperature detection pixels connected to both one of the drive lines selected by the vertical scanning circuit and one of the signal lines that is selected by the signal line selection circuit, a total number of the read circuits being smaller than a total number of the signal lines connected to the columns of the temperature detection pixels.

2. The infrared imaging element according to claim 1, further comprising:
a variable clock output unit that outputs a control signal configured to control sequential selection of the signal lines by the signal line selection circuit; and
an image calculation unit that generates an output signal by adjusting an array of pixels in the output signal, based on signals from the read circuits.

3. The infrared imaging element according to claim 2, wherein the variable clock output unit and the signal line selection circuit are configured to switch any column of the temperature detection pixels to be read.

4. The infrared imaging element according to claim 2, wherein the vertical scanning circuit, the variable clock output unit, and the signal line selection circuit can switch any pixel to be read.

5. The infrared imaging element according to claim 1, wherein the signal line selection circuit that sequentially selects the signal lines is disposed between the pixel array unit arrayed in the two-dimensional fashion and each of the read circuits.

6. The infrared imaging element according to claim 1, further comprising a current source connected to cathode sides of the diodes, wherein
the vertical scanning circuit is connected to anode sides of the diodes via the drive lines, and
the vertical scanning circuit selects the drive lines in such a way that conduction periods of the temperature detection pixels become constant.

7. The infrared imaging element according to claim 1, further comprising a current source connected to a node at which the signal line selection circuit is connected to the read circuits, wherein
the vertical scanning circuit is connected to anode sides of the diodes via the drive lines,
the signal line selection circuit is connected to cathode sides of the diodes via the signal lines, and
the signal line selection circuit selects the signal lines at regular intervals.

8. The infrared imaging element according to claim 1, wherein
an N number of read circuits are provided, N being an integer of two or more,
the plurality of signal lines are divided into N number of groups, and
the signal line selection circuit selects one signal line in each of the groups and connects the selected signal line to a corresponding one of the read circuits.

9. The infrared imaging element according to claim 8, further comprising a horizontal scanning circuit that receives a plurality of output signals from the read circuits, sequentially selects one of the plurality of output signals, and outputs the selected output signal.

10. The infrared imaging element according to claim 1, wherein
the signal line selection circuit continues to select the same column of the temperature detection pixels over a period in which the vertical scanning circuit repeats, an M number of times, scanning from a first row to a last row of a pixel array in the pixel array unit, M being an integer of two or more, and
the infrared imaging element further comprises an image calculation unit that averages an M number of output signals obtained from the same temperature detection pixel to determine an output signal of the same temperature detection pixel.

11. The infrared imaging element according to claim 1, wherein
the pixel array unit includes one or more columns of the temperature detection pixels and one or more columns of reference pixels that are insensitive to the infrared rays coming from the outside,
the vertical scanning circuit further sequentially selects first ends of the reference pixels,
the read circuits are connected to second ends of the reference pixels and read signals from the reference pixels, and
the read circuits calculate differences between signals from the temperature detection pixels and signals from the reference pixels.

12. The infrared imaging element according to claim 11, wherein each of the reference pixels further includes an infrared shielding film that blocks entry of infrared rays in addition to a configuration of each of the temperature detection pixels.

13. The infrared imaging element according to claim 12, wherein the columns of the reference pixels are arranged at both ends of the drive lines in the pixel array unit.

14. The infrared imaging element according to claim 12, wherein
differences between signals from the temperature detection pixels in one of the rows of the temperature detection pixels and signals from reference pixels connected to the drive lines connecting the one of the rows of the temperature detection pixels are calculated and output.

15. The infrared imaging element according to claim 11, wherein the columns of the reference pixels are arranged at both ends of the drive lines in the pixel array unit.

16. The infrared imaging element according to claim 15, wherein
differences between signals from the temperature detection pixels in one of the rows of the temperature detection pixels and signals from reference pixels connected to the drive lines connecting the one of the rows of the temperature detection pixels are calculated and output.

17. The infrared imaging element according to claim 11, wherein
differences between signals from the temperature detection pixels in one of the rows of the temperature detection pixels and signals from reference pixels connected to the drive lines connecting the one of the rows of the temperature detection pixels are calculated and output.

18. An air conditioner comprising:
the infrared imaging element according to claim 11; and
a blade configured to change a wind direction.

19. An air conditioner comprising:
the infrared imaging element according to claim 1; and
a blade configured to change a wind direction.

* * * * *